(12) United States Patent
Mellet et al.

(10) Patent No.: US 9,133,915 B2
(45) Date of Patent: Sep. 15, 2015

(54) MULTI-SPEED TRANSMISSION

(71) Applicant: GM Global Technology Operations LLC, Detroit, MI (US)

(72) Inventors: Edward W. Mellet, Rochester Hills, MI (US); James M. Hart, Belleville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/102,067

(22) Filed: Dec. 10, 2013

(65) Prior Publication Data

US 2015/0159738 A1 Jun. 11, 2015

(51) Int. Cl.
*F16H 3/62* (2006.01)

(52) U.S. Cl.
CPC .......... *F16H 3/62* (2013.01); *F16H 2200/0073* (2013.01); *F16H 2200/2012* (2013.01); *F16H 2200/2048* (2013.01)

(58) Field of Classification Search
CPC ..... F16H 3/44; F16H 3/62; F16H 2200/0073; F16H 2200/2012; F16H 2200/2048
See application file for complete search history.

(56) References Cited

U.S. PATENT DOCUMENTS

| | | | |
|---|---|---|---|
| 6,991,578 B2 | 1/2006 | Ziemer | |
| 7,018,319 B2 | 3/2006 | Ziemer | |
| 7,402,119 B2 | 7/2008 | Kamada et al. | |
| 8,152,683 B2 | 4/2012 | Phillips | |
| 8,343,007 B2 | 1/2013 | Hart et al. | |
| 8,465,390 B2 | 6/2013 | Brehmer et al. | |
| 8,632,435 B2 | 1/2014 | Garcia et al. | |
| 8,651,996 B2 | 2/2014 | Mellet et al. | |
| 8,734,286 B2 | 5/2014 | Coffey et al. | |
| 8,758,185 B2 | 6/2014 | Mellet et al. | |
| 8,795,127 B2 | 8/2014 | Singh | |
| 8,795,128 B2 | 8/2014 | Mellet et al. | |
| 8,801,564 B2 | 8/2014 | Singh | |
| 8,870,705 B2 | 10/2014 | Diemer et al. | |
| 8,915,819 B2 | 12/2014 | Coffey et al. | |
| 2005/0113205 A1* | 5/2005 | Oguri et al. | 475/275 |
| 2009/0192009 A1* | 7/2009 | Phillips et al. | 475/275 |
| 2010/0210394 A1* | 8/2010 | Phillips et al. | 475/275 |
| 2010/0210395 A1* | 8/2010 | Phillips et al. | 475/275 |
| 2013/0260942 A1 | 10/2013 | Garcia et al. | |
| 2014/0248989 A1 | 9/2014 | Hart et al. | |
| 2014/0256500 A1 | 9/2014 | Mellet et al. | |

* cited by examiner

*Primary Examiner* — Huan Le (57) ABSTRACT

A transmission has an input member, an output member, at least four planetary gear sets, a plurality of coupling members and a plurality of torque transmitting devices. Each of the planetary gear sets includes first, second and third members. The torque transmitting devices include clutches and brakes actuatable in combinations of four or more to establish a plurality of forward gear ratios and at least one reverse gear ratio.

24 Claims, 7 Drawing Sheets

| GEAR STATE | GEAR RATIO | TORQUE TRANSMITTING ELEMENTS | | | | | | |
|---|---|---|---|---|---|---|---|---|
| | | 36 | 34 | 24 | 26 | 32 | 30 | 28 |
| REV1 | -4.460 | X | X | | X | X | | |
| N | | | | | | | | |
| 1ST | 6.630 | X | X | | | X | | X |
| 2ND | 4.300 | X | X | | | X | X | |
| 3RD | 2.730 | X | X | X | | X | | |
| 4TH | 2.100 | | X | X | | X | X | |
| 5TH | 1.510 | | X | X | X | X | | |
| 6TH | 1.270 | | X | X | X | | X | |
| 7TH | 1.090 | | X | | X | X | X | |
| 8TH | 1.000 | | | X | X | X | X | |
| 9TH | 0.850 | X | | | X | X | X | |
| 10TH | 0.690 | X | | X | X | | X | |
| 11TH | 0.64 | X | | X | X | X | X | |

X = ON - ENGAGED CARRYING TORQUE

FIG. 3

| GEAR STATE | GEAR RATIO | TORQUE TRANSMITTING ELEMENTS | | | | | | |
|---|---|---|---|---|---|---|---|---|
| | | 36 | 34 | 24 | 26 | 32 | 30 | 28 |
| REV1 | -4.460 | X | X | | X | X | | |
| N | | | | | | | | |
| 1ST | 6.630 | X | X | | | X | | X |
| 2ND | 4.300 | X | X | X | X | X | X | X |
| 3RD | 2.730 | X | X | X | | X | | |
| 4TH | 2.100 | | X | X | | X | | X |
| 4TH | 2.100 | | X | X | | | X | X |
| 4TH | 2.100 | | X | X | | X | X | |
| 4TH | 2.100 | | X | | | X | X | X |
| 4TH | 1.780 | | X | X | X | X | | |
| 5TH | 1.510 | | X | X | X | | X | |
| 6TH | 1.270 | | X | | X | X | X | |
| 7TH | 1.090 | X | | | X | X | | X |
| 8TH | 1.000 | | | | X | X | X | X |
| 8TH | 1.000 | | | X | X | X | | X |
| 8TH | 1.000 | | X | | X | | X | X |
| 8TH | 1.000 | | | X | X | | X | X |
| 8TH | 1.000 | | | X | X | X | X | |
| 8TH | 1.000 | X | | | X | | X | X |
| 9TH | 0.860 | X | | | X | X | X | |
| 9TH | 0.850 | | X | | X | X | | X |
| 10TH | 0.690 | X | | X | X | | X | |
| 11TH | 0.64 | X | | X | X | X | | |

X = ON - ENGAGED CARRYING TORQUE

| GEAR STATE | GEAR RATIO | TORQUE TRANSMITTING ELEMENTS | | | | | | |
|---|---|---|---|---|---|---|---|---|
| | | 134 | 136 | 126 | 124 | 132 | 128 | 130 |
| REV1 | -4.923 | X | X |   | X |   | X |   |
| N |   |   |   |   |   |   |   |   |
| 1ST | 7.221 | X | X |   | X |   |   | X |
| 2ND | 4.724 | X | X | X |   | X | X | X |
| 3RD | 3.022 | X | X | X | X |   |   |   |
| 4TH | 2.118 | X |   |   | X | X |   | X |
| 4TH | 2.118 | X | X |   | X |   |   | X |
| 4TH | 2.118 | X |   | X | X |   |   | X |
| 4TH | 2.118 | X |   | X | X | X |   |   |
| 4TH | 1.730 | X |   | X | X |   | X |   |
| 5TH | 1.498 | X |   | X |   | X | X |   |
| 6TH | 1.262 | X |   |   | X | X | X |   |
| 7TH | 1.079 |   |   |   | X |   | X | X |
| 8TH | 1.000 |   |   |   | X | X | X | X |
| 8TH | 1.000 |   |   | X |   | X | X | X |
| 8TH | 1.000 |   | X |   |   | X | X | X |
| 8TH | 1.000 | X |   |   |   | X | X | X |
| 8TH | 1.000 |   |   | X | X | X | X |   |
| 8TH | 1.000 |   |   | X | X |   | X | X |
| 9TH | 0.871 | X |   |   | X |   | X | X |
| 9TH | 0.856 |   | X |   | X | X | X |   |
| 10TH | 0.693 |   | X | X |   | X | X |   |
| 11TH | 0.64 |   | X | X | X |   | X |   |

X = ON - ENGAGED CARRYING TORQUE

| GEAR STATE | GEAR RATIO | TORQUE TRANSMITTING ELEMENTS ||||||| 
|---|---|---|---|---|---|---|---|---|
| | | 134 | 136 | 126 | 124 | 132 | 128 | 130 |
| REV1 | -4.923 | X | X | | X | | X | |
| N | | | | | | | | |
| 1ST | 7.221 | X | X | X | X | | X | X |
| 2ND | 4.724 | X | X | X | X | X | X | |
| 3RD | 3.022 | X | X | X | X | | | |
| 4TH | 2.118 | X | | | | X | X | X |
| 4TH | 2.118 | X | | | X | X | | X |
| 4TH | 2.118 | X | | X | | | X | X |
| 4TH | 2.118 | X | | X | X | | | X |
| 4TH | 2.118 | X | | X | X | X | | |
| 5TH | 1.730 | X | | X | X | | X | |
| 6TH | 1.498 | X | | X | | X | X | |
| 7TH | 1.385 | X | | X | | | X | X |
| 8TH | 1.262 | X | | | X | X | X | |
| 8TH | 1.079 | | X | | X | | X | X |
| 8TH | 1.000 | | | | X | X | X | X |
| 8TH | 1.000 | | | X | X | | X | X |
| 8TH | 1.000 | | | X | X | X | X | |
| 8TH | 1.000 | | | X | | X | X | X |
| 9TH | 0.871 | X | | | X | | X | X |
| 9TH | 0.856 | | X | | X | X | X | |
| 10TH | 0.729 | | X | X | | | X | X |
| 10TH | 0.693 | | X | X | | X | X | |
| 11TH | 0.64 | | X | X | X | | X | |

X = ON - ENGAGED CARRYING TORQUE

FIG. 9

MULTI-SPEED TRANSMISSION

FIELD

The invention relates generally to a multiple speed transmission having a plurality of planetary gear sets and a plurality of torque transmitting devices and more particularly to a transmission having eleven or more speeds, at least four planetary gear sets and a plurality of torque transmitting devices.

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A transmission is provided having an input member, an output member, four planetary gear sets, a plurality of coupling members and a plurality of torque transmitting devices. Each of the planetary gear sets includes first, second and third members. The torque transmitting devices are for example clutches and brakes.

In an embodiment of the present invention, the first, second, third and fourth planetary gear sets each having a sun gear, a carrier member and a ring gear.

In still another embodiment of the present invention, the input member is continuously connected for common rotation with the carrier member of the second planetary gear set.

In still another embodiment of the present invention, the output member is continuously connected for common rotation with the carrier member of the fourth planetary gear set.

In still another embodiment of the present invention, a first interconnecting member continuously interconnects the sun gear of the first planetary gear set with the sun gear of the second planetary gear set.

In still another embodiment of the present invention, a second interconnecting member continuously interconnects the carrier member of the first planetary gear set with the ring gear of the fourth planetary gear set.

In still another embodiment of the present invention, a third interconnecting member continuously interconnects the ring gear of the second planetary gear set with the sun gear of the third planetary gear set.

In still another embodiment of the present invention, a fourth interconnecting member continuously interconnects the ring gear of the third planetary gear set with the sun gear of the fourth planetary gear set.

In yet another embodiment of the present invention, a first torque transmitting mechanism is selectively engageable to interconnect the ring gear of the second planetary gear set and the sun gear of the third planetary gear set with the ring gear of the third planetary gear set.

In yet another embodiment of the present invention, a second torque transmitting mechanism is selectively engageable to interconnect the carrier member of the third planetary gear set with the carrier member of the first planetary gear set and the ring gear of the fourth planetary gear set.

In yet another embodiment of the present invention, a third torque transmitting mechanism is selectively engageable to interconnect the carrier member of the third planetary gear set with the carrier member of the second planetary gear set and the input member.

In yet another embodiment of the present invention, a fourth torque transmitting mechanism is selectively engageable to interconnect the carrier member of the second planetary gear set and the input member with the sun gear of the fourth planetary gear set.

In yet another embodiment of the present invention, a fifth torque transmitting mechanism is selectively engageable to interconnect the ring gear of the third planetary gear set with the sun gear of the fourth planetary gear set.

In yet another embodiment of the present invention, a sixth torque transmitting mechanism is selectively engageable to interconnect the ring gear of the first planetary gear set with the stationary member.

In yet another embodiment of the present invention, a seventh torque transmitting mechanism is selectively engageable to interconnect the sun gear of the first planetary gear set and the sun gear of the second planetary gear set with the stationary member.

In yet another embodiment of the present invention, the torque transmitting mechanisms are selectively engageable in combinations of at least four to establish a plurality of forward speed ratios and at least one reverse speed ratio between the input member and the output member.

In yet another embodiment of the present invention, a common rotational member or hub is provided, wherein three or four clutches interconnect the common rotational member to at least one member of the four planetary gear sets.

Further features, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

At the outset, it should be appreciated that the embodiments of the multi-speed automatic transmissions of the present invention have an arrangement of permanent mechanical connections between the elements of the four planetary gear sets. For example, a first component or element of a first planetary gear set is permanently coupled to a first component or element of the second planetary gear set. A second component or element of the first planetary gear set is permanently coupled a first component or element of the fourth planetary gear set. A third component or element of the second planetary gear set is permanently coupled to a third component or element of the third planetary gear set.

Figure 1:
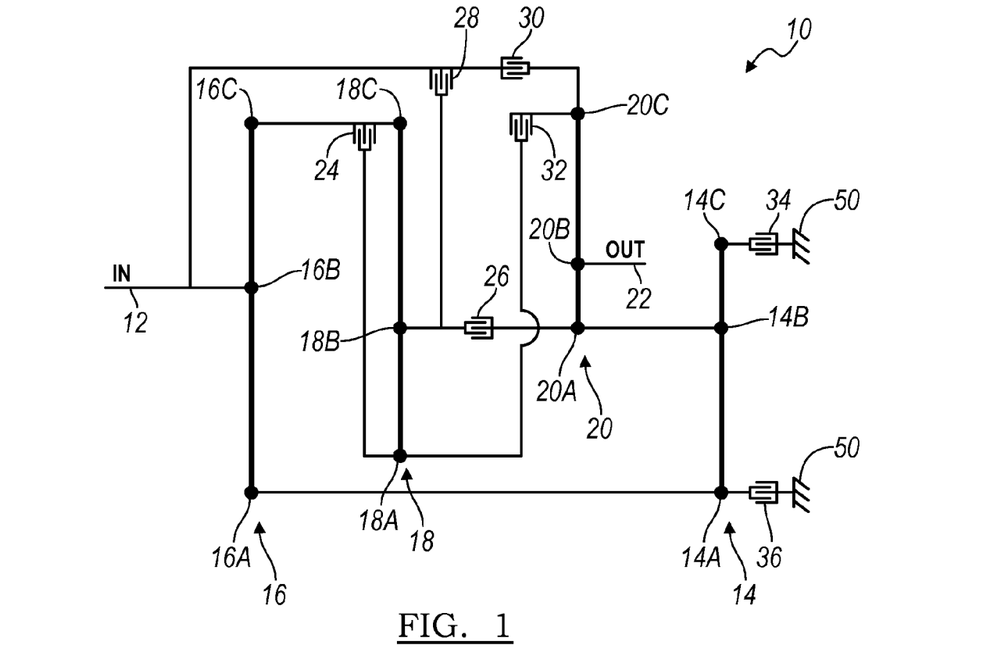
FIG. 1 is a lever diagram of an embodiment of an eleven speed transmission according to the present invention.

Referring now to FIG. 1, an embodiment of an eleven speed transmission 10 is illustrated in a lever diagram format. A lever diagram is a schematic representation of the components of a mechanical device such as an automatic transmission. Each individual lever represents a planetary gear set wherein the three basic mechanical components of the planetary gear set (sun gear, planet gear carrier and ring gear) are each represented by a node. Therefore, a single lever contains three nodes: one for the sun gear, one for the planet gear carrier, and one for the ring gear. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14, a second planetary gear set 16, a third planetary gear set 18 and a fourth planetary gear set 20 and an output shaft or member 22. In the lever diagram of FIG. 1, the first planetary gear set 14 has three nodes: a first node 14A, a second node 14B and a third node 14C. The second planetary gear set 16 has three nodes: a first node 16A, a second node 16B and a third node 16C. The third planetary gear set 18 has three nodes: a first node 18A, a second node 18B and a third node 18C. The fourth planetary gear set 20 has three nodes: a first node 20A, a second node 20B and a third node 20C.

The input member 12 is continuously coupled to the second node 16B of the second planetary gear set 16. The output member 22 is coupled to the second node 20B of the fourth planetary gear set 20. The first node 14A of the first planetary gear set 14 is coupled to the first node 16A of the second planetary gear set 16. The second node 14B of the first planetary gear set 14 is coupled to the first node 20A of the fourth planetary gear set 20. The third node 16C of the second planetary gear set 16 is coupled to the third node 18C of the third planetary gear set 18.

A first clutch 24 selectively connects the third node 16C of the second planetary gear set 16 and the third node 18C of the third planetary gear set 18 with the first node 18A of the third planetary gear set 18. A second clutch 26 selectively connects the second node 18B of the third planetary gear set 18 with the second node 14B of the first planetary gear set 14 and the first node 20A of the fourth planetary gear set 20. A third clutch 28 selectively connects the input member 12 and the second node 16B of the second planetary gear set 16 with the second node 18B of the third planetary gear set 18. A fourth clutch 30 selectively connects input member 12 and the second node 16B of the second planetary gear set 16 with the third node 20C of the fourth planetary gear set 20. A fifth clutch 32 selectively connects the first node 18A of the third planetary gear set 18 with the third node 20C of the fourth planetary gear set 20. A first brake 34 selectively connects the third node 14C of the first planetary gear set 14 with a stationary member or transmission housing 50. A second brake 36 selectively connects the first node 14A of the first planetary gear set 14 and the first node 16A of the second planetary gear set 16 with the stationary member or transmission housing 50.

Figure 2:
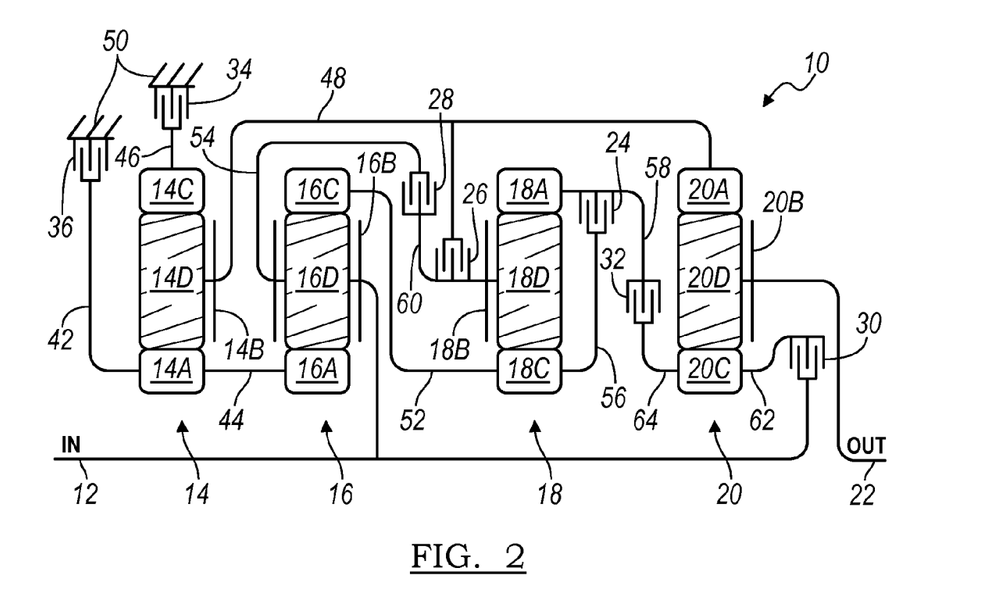
FIG. 2 is a diagrammatic illustration of an embodiment of an eleven speed transmission according to the present invention.

Referring now to FIG. 2, a stick diagram presents a schematic layout of an embodiment of the eleven speed transmission 10 according to the present invention. In FIG. 2, the numbering from the lever diagram of FIG. 1 is carried over. The clutches and couplings are correspondingly presented whereas the nodes of the planetary gear sets now appear as components of planetary gear sets such as sun gears, ring gears, planet gears and planet gear carriers.

For example, the planetary gear set 14 includes a sun gear member 14A, a ring gear member 14C and a planet gear carrier member 14B that rotatably supports a set of planet gears 14D (only one of which is shown). The sun gear member 14A is connected for common rotation with a first shaft or interconnecting member 42 and a second shaft or interconnecting member 44. The ring gear member 14C is connected for common rotation with a third shaft or interconnecting member 46. The planet carrier member 14B is connected for common rotation with a fourth shaft or interconnecting member 48. The planet gears 14D are each configured to intermesh with both the sun gear member 14A and the ring gear member 14C.

The planetary gear set 16 includes a sun gear member 16A, a ring gear member 16C and a planet gear carrier member 16B that rotatably supports a set of planet gears 16D (only one of which is shown). The sun gear member 16A is connected for common rotation with the second shaft or interconnecting member 44. The ring gear member 16C is connected for common rotation with a fifth shaft or interconnecting member 52. The planet carrier member 16B is connected for common rotation with the input shaft or member 12 and a sixth shaft or interconnecting member 54. The planet gears 16D are each configured to intermesh with both the sun gear member 16A and the ring gear member 16C.

The planetary gear set 18 includes a sun gear member 18C, a ring gear member 18A and a planet gear carrier member 18B that rotatably supports a set of planet gears 18D (only one of which is shown). The sun gear member 18C is connected for common rotation with the fifth shaft or interconnecting member 52 and a seventh shaft or interconnecting member 56. The ring gear member 18A is connected for common rotation with an eighth shaft or interconnecting member 58. The planet carrier member 18B is connected for common rotation with a ninth shaft or interconnecting member 60. The planet gears 18D are each configured to intermesh with both the sun gear member 18C and the ring gear member 18A.

The planetary gear set 20 includes a sun gear member 20C, a ring gear member 20A and a planet gear carrier member 20B that rotatably supports a set of planet gears 20D (only one of which is shown). The sun gear member 20C is connected for common rotation with a tenth shaft or interconnecting member 62 and an eleventh shaft or interconnecting member 64. The ring gear member 20A is connected for common rotation with the fourth shaft or interconnecting member 48. The planet carrier member 20B is connected for common rotation with the output shaft or member 22. The planet gears 20D are each configured to intermesh with both the sun gear member 20C and the ring gear member 20A.

The input shaft or member 12 is continuously connected to an engine (not shown) or to a turbine of a torque converter (not shown). The output shaft or member 22 is continuously connected with the final drive unit or transfer case (not shown).

The torque-transmitting mechanisms or clutches 24, 26, 28, 30, 32 and brakes 34 and 36 allow for selective interconnection of the shafts or interconnecting members, members of the planetary gear sets and the housing. For example, the first clutch 24 is selectively engageable to connect the seventh shaft or interconnecting member 56 with the eighth shaft or interconnecting member 58. The second clutch 26 is selectively engageable to connect the fourth shaft or interconnecting member 48 with the ninth shaft or interconnecting member 60. The third clutch 28 is selectively engageable to connect the sixth shaft or interconnecting member 54 with the ninth shaft or interconnecting member 60. The fourth clutch 30 is selectively engageable to connect the input shaft or member 12 with the tenth shaft or interconnecting member 62. The fifth clutch 32 is selectively engageable to connect the eighth shaft or interconnecting member 58 with the eleventh shaft or interconnecting member 64. The first brake 34 is selectively engageable to connect the third shaft or interconnecting member 46 with the stationary element or the transmission housing 50 in order to restrict the member 46 from rotating relative to the transmission housing 50. The second brake 36 is selectively engageable to connect the first shaft or interconnecting member 42 with the stationary element or the transmission housing 50 in order to restrict the member 42 from rotating relative to the transmission housing 50.

Figure 3:
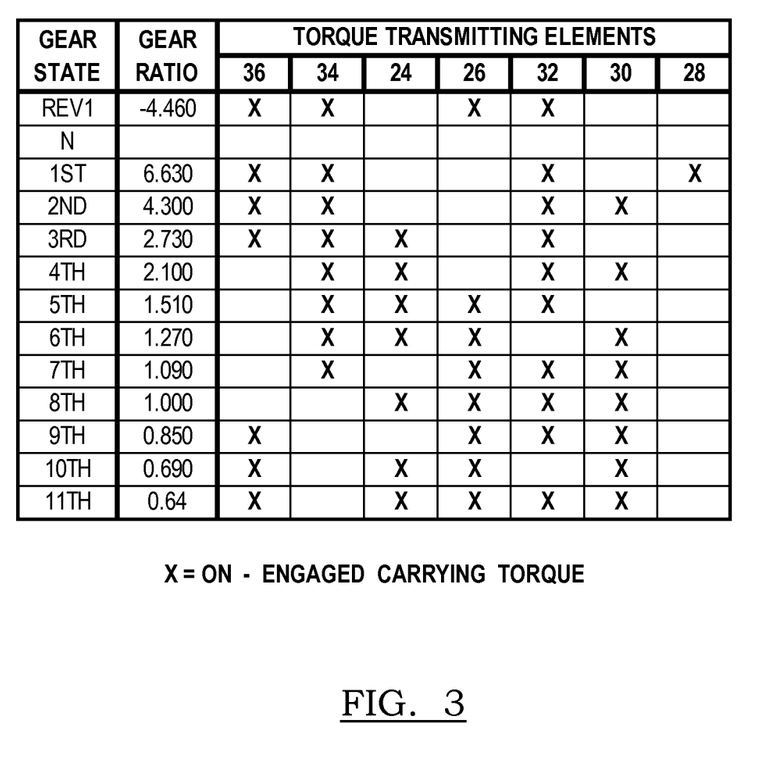
FIG. 3 is a truth table presenting the state of engagement of the various torque transmitting elements in each of the available forward and reverse speeds or gear ratios of the transmissions illustrated in FIGS. 1 and 2.

Referring now to FIG. 2 and FIG. 3, the operation of the eleven speed transmission 10 will be described. It will be appreciated that transmission 10 is capable of transmitting torque from the input shaft or member 12 to the output shaft or member 22 in at least eleven forward speed or torque ratios and at least one reverse speed or torque ratio. Each forward and reverse speed or torque ratio is attained by engagement of one or more of the torque-transmitting mechanisms (i.e. first clutch 24, second clutch 26, third clutch 28, fourth clutch 30, fifth clutch 32, first brake 34 and second brake 36), as will be explained below. FIG. 3 is a truth table presenting the various combinations of torque-transmitting mechanisms that are activated or engaged to achieve the various gear states. An "X" in the box means that the particular clutch or brake is engaged to achieve the desired gear state. Actual numerical gear ratios of the various gear states are also presented although it should be appreciated that these numerical values are exemplary only and that they may be adjusted over significant ranges to accommodate various applications and operational criteria of the transmission 10. Of course, other gear ratios are achievable depending on the gear diameter, gear teeth count and gear configuration selected.

Figure 4:
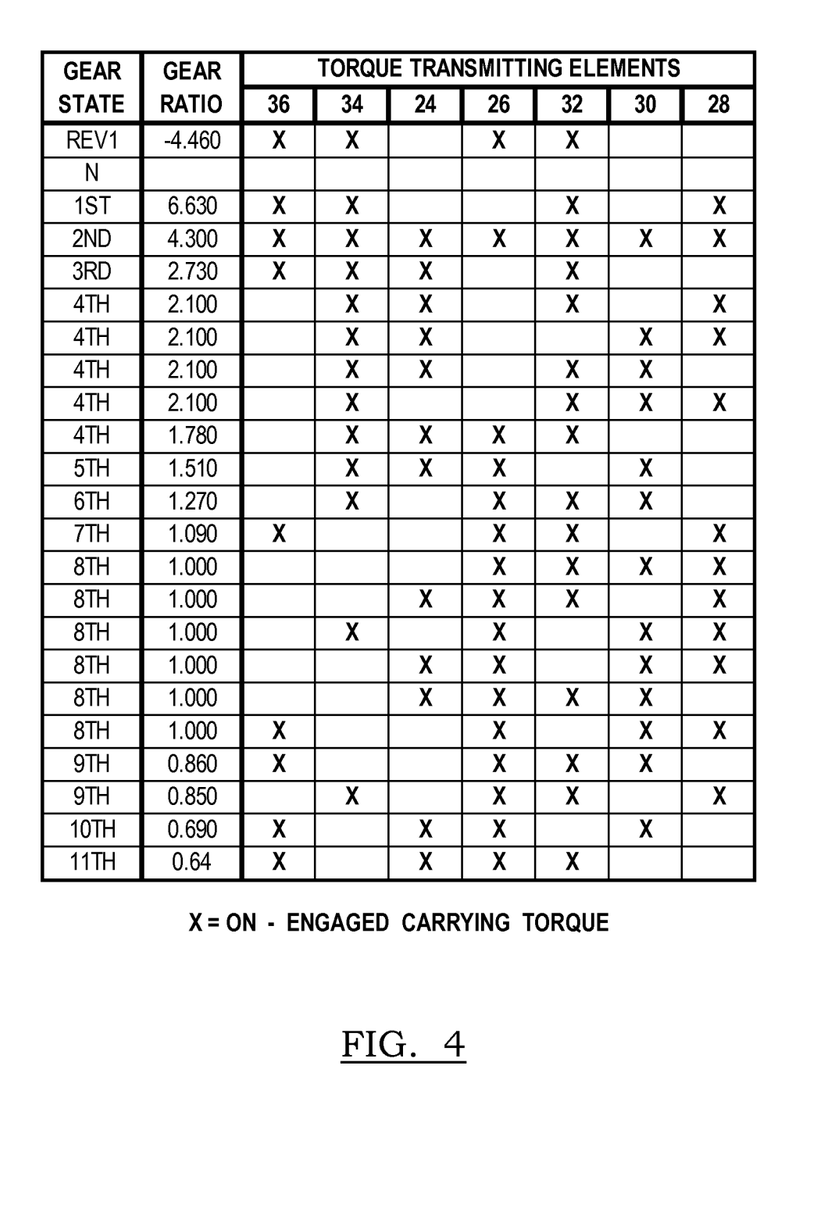
FIG. 4 is a truth table presenting additional states of engagement of the various torque transmitting elements in each of the available additional forward and reverse speeds or gear ratios of the transmissions illustrated in FIGS. 1 and 2.

For example to establish a reverse gear (REV1), second clutch 26, fifth clutch 32 and first and second brakes 34 and 36 are engaged or activated. The second clutch 26 connects the fourth shaft or interconnecting member 48 with the ninth shaft or interconnecting member 60. The fifth clutch 32 connects the eighth shaft or interconnecting member 58 with the eleventh shaft or interconnecting member 64. The first brake 34 connects the third shaft or interconnecting member 46 with the stationary element or the transmission housing 50 in order to restrict the member 46 from rotating relative to the transmission housing 50. The second brake 36 connects the first shaft or interconnecting member 42 with the stationary element or the transmission housing 50 in order to restrict the member 42 from rotating relative to the transmission housing 50. Likewise, the eleven forward ratios are achieved through different combinations of clutch and brake engagement, as shown in FIG. 3. Moreover, the transmission 10 of the present invention is capable of producing alternate gear ratios for a given gear state, as shown in FIG. 4. The alternate gear ratios are achieved, as indicated in a FIG. 4, through the selective engagement of torque transmitting members 24, 26, 28, 30, 32, 34 and 36.

It will be appreciated that the foregoing explanation of operation and gear states of the eleven speed transmission 10 assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated.

Figure 5:
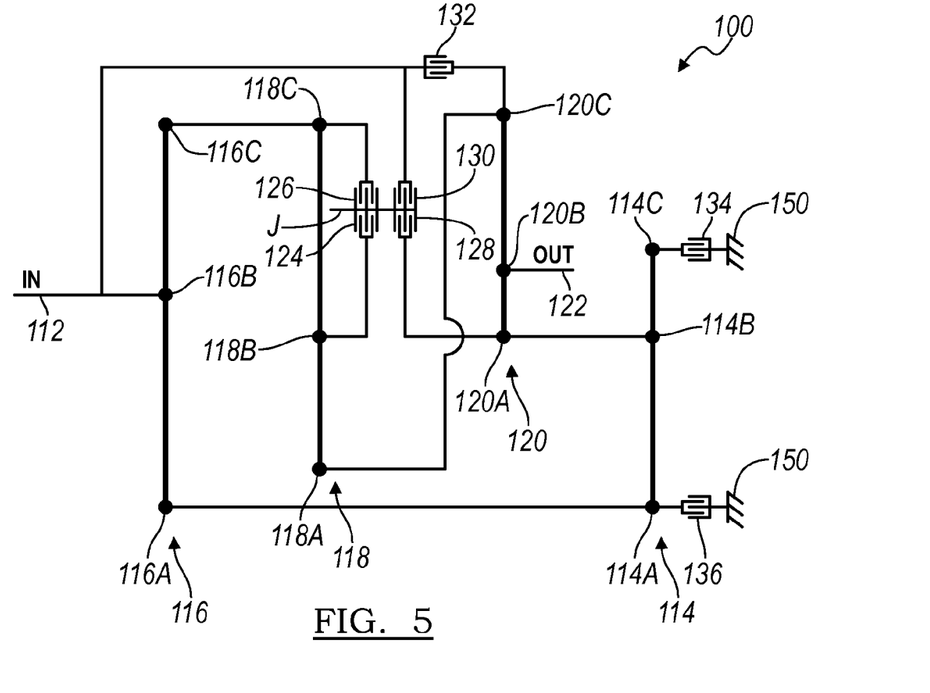
FIG. 5 is a lever diagram of another embodiment of an eleven speed transmission according to the present invention.

Referring now to FIG. 5, another embodiment of the present invention is illustrated in a lever diagram format and referenced as eleven speed transmission 100. The transmission 100 includes an input shaft or member 112, a first planetary gear set 114, a second planetary gear set 116, a third planetary gear set 118 and a fourth planetary gear set 120 and an output shaft or member 122. The first planetary gear set 114 has three nodes: a first node 114A, a second node 114B and a third node 114C. The second planetary gear set 116 has three nodes: a first node 116A, a second node 116B and a third node 116C. The third planetary gear set 118 has three nodes: a first node 118A, a second node 118B and a third node 118C. The fourth planetary gear set 120 has three nodes: a first node 120A, a second node 120B and a third node 120C.

The input member 112 is continuously coupled to the second node 116B of the second planetary gear set 116. The output member 122 is coupled to the second node 120B of the fourth planetary gear set 120. The first node 114A of the first planetary gear set 114 is coupled to the first node 116A of the second planetary gear set 116. The second node 114B of the first planetary gear set 114 is coupled to the first node 120A of the fourth planetary gear set 120. The third node 116C of the second planetary gear set 116 is coupled to the third node 118C of the third planetary gear set 118. The first node 118A of the third planetary gear set 118 is coupled to the third node 120C of the fourth planetary gear set 120.

A first clutch 124 selectively connects the third node 118B of the third planetary gear set 118 with a common rotational member J. Common rotational member J is a structural member (i.e. a hub) that is configured to rotate and is supported for rotation by the transmission housing 150. A second clutch 126 selectively connects third node 116C of the second planetary gear set 116 and the third node 118C of the third planetary gear set 118 with the common rotational member J. A third clutch 128 selectively connects the second node 114B of the first planetary gear set 114 and the first node 120A of the fourth planetary gear set 120 with the common rotational member J. A fourth clutch 130 selectively connects input member 112 and the second node 116B of the second planetary gear set 116 with the common rotational member J. A fifth clutch 132 selectively connects input member 112 and the second node 116B of the second planetary gear set 116 with the first node 118A of the third planetary gear set 118 and the third node 120C of the fourth planetary gear set 120. A first brake 134 selectively connects the third node 114C of the first planetary gear set 114 with a stationary member or transmission housing 150. A second brake 136 selectively connects the first node 114A of the first planetary gear set 114 with the stationary member or transmission housing 150.

Figure 6:
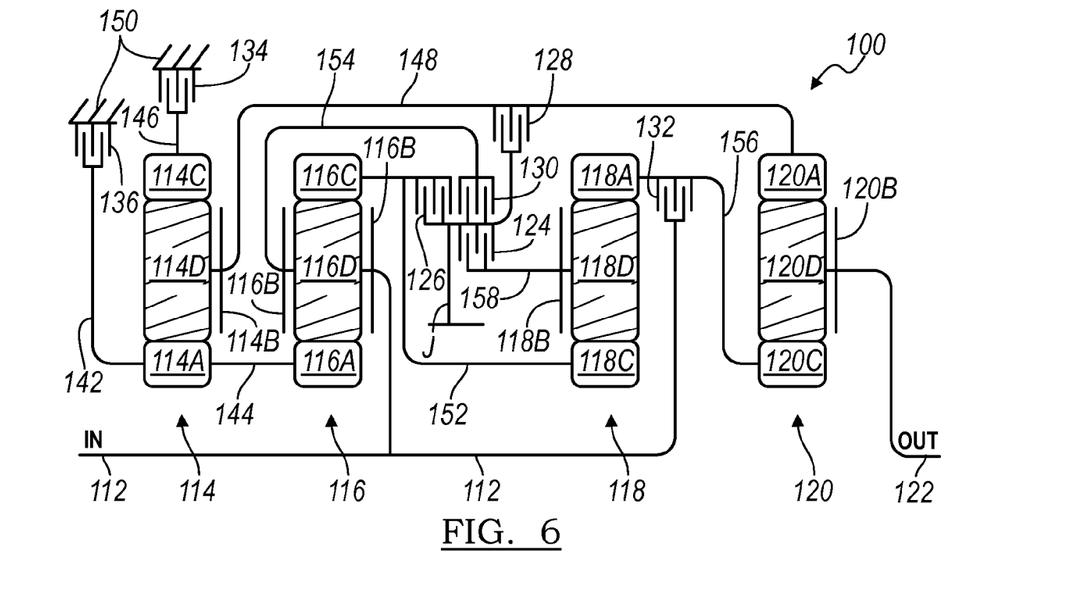
FIG. 6 is a diagrammatic illustration of another embodiment of an eleven speed transmission according to the present invention.

Referring now to FIG. 6, a stick diagram presents a schematic layout of an embodiment of the eleven speed transmission 110 according to the present invention. In FIG. 6, the numbering from the lever diagram of FIG. 5 is carried over. The clutches and couplings are correspondingly presented whereas the nodes of the planetary gear sets now appear as components of planetary gear sets such as sun gears, ring gears, planet gears and planet gear carriers.

For example, the planetary gear set 114 includes a sun gear member 114A, a ring gear member 114C and a planet gear carrier member 114B that rotatably supports a set of planet gears 114D (only one of which is shown). The sun gear member 114A is connected for common rotation with a first shaft or interconnecting member 142 and a second shaft or interconnecting member 144. The ring gear member 114C is connected for common rotation with a third shaft or interconnecting member 146. The planet carrier member 114B is connected for common rotation with a fourth shaft or interconnecting member 148. The planet gears 114D are each configured to intermesh with both the sun gear member 114A and the ring gear member 114C.

The planetary gear set 116 includes a sun gear member 116A, a ring gear member 116C and a planet gear carrier member 116B that rotatably supports a set of planet gears 116D (only one of which is shown). The sun gear member 116A is connected for common rotation with the second shaft or interconnecting member 144. The ring gear member 116C is connected for common rotation with a fifth shaft or interconnecting member 152. The planet carrier member 116B is connected for common rotation with the input shaft or member 112 and a sixth shaft or interconnecting member 154. The planet gears 116D are each configured to intermesh with both the sun gear member 116A and the ring gear member 116C.

The planetary gear set 118 includes a sun gear member 118C, a ring gear member 118A and a planet gear carrier member 118B that rotatably supports a set of planet gears 118D (only one of which is shown). The sun gear member 118C is connected for common rotation with the fifth shaft or interconnecting member 152. The ring gear member 118A is connected for common rotation with a seventh shaft or interconnecting member 156. The planet carrier member 118B is connected for common rotation with an eighth shaft or interconnecting member 158. The planet gears 118D are each configured to intermesh with both the sun gear member 118C and the ring gear member 118A.

The planetary gear set 120 includes a sun gear member 120C, a ring gear member 120A and a planet gear carrier member 120B that rotatably supports a set of planet gears 120D (only one of which is shown). The sun gear member 120C is connected for common rotation with the seventh shaft or interconnecting member 156. The ring gear member 120A is connected for common rotation with the fourth shaft or interconnecting member 148. The planet carrier member 120B is connected for common rotation with the output shaft or member 122. The planet gears 120D are each configured to intermesh with both the sun gear member 120C and the ring gear member 120A.

The input shaft or member 112 is continuously connected to an engine (not shown) or to a turbine of a torque converter (not shown). The output shaft or member 122 is continuously connected with the final drive unit or transfer case (not shown).

The torque-transmitting mechanisms or clutches 124, 126, 128, 130, 132 and brakes 134 and 136 allow for selective interconnection of the shafts or interconnecting members, members of the planetary gear sets and the housing. For example, the first clutch 124 is selectively engageable to connect the eighth shaft or interconnecting member 158 with the common member J. The second clutch 126 is selectively engageable to connect the fifth shaft or interconnecting member 152 with the common member J. The third clutch 128 is selectively engageable to connect the fourth shaft or interconnecting member 148 with the common member J. The fourth clutch 130 is selectively engageable to connect the sixth shaft or interconnecting member 154 with the common member J. The fifth clutch 132 is selectively engageable to connect the seventh shaft or interconnecting member 156 with the input shaft or member 112. The first brake 134 is selectively engageable to connect the third shaft or interconnecting member 146 with the stationary element or the transmission housing 150 in order to restrict the member 146 from rotating relative to the transmission housing 150. The second brake 136 is selectively engageable to connect the first shaft or interconnecting member 142 with the stationary element or the transmission housing 150 in order to restrict the member 142 from rotating relative to the transmission housing 150.

Figure 7:
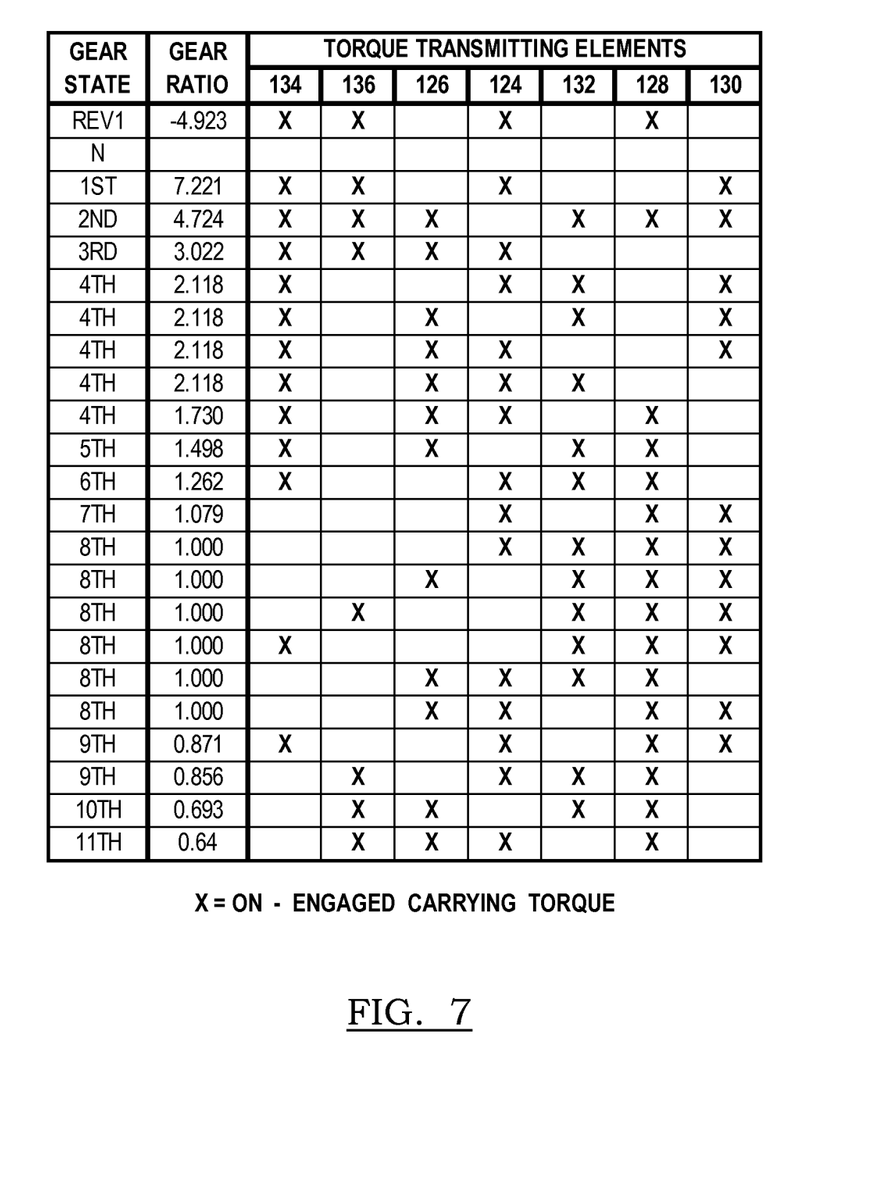
FIG. 7 is a truth table presenting the states of engagement of the various torque transmitting elements in each of the available forward and reverse speeds or gear ratios and additional speeds or gear ratios of the transmissions illustrated in FIGS. 5 and 6.

Referring now to FIG. 6 and FIG. 7, the operation of the eleven speed transmission 100 will be described. It will be appreciated that transmission 100 is capable of transmitting torque from the input shaft or member 112 to the output shaft or member 122 in at least eleven forward speed or torque ratios and at least one reverse speed or torque ratio. Each forward and reverse speed or torque ratio is attained by engagement of one or more of the torque-transmitting mechanisms (i.e. first clutch 124, second clutch 126, third clutch 128, fourth clutch 130, fifth clutch 132, first brake 134 and second brake 136), as will be explained below. FIG. 7 is a truth table presenting the various combinations of torque-transmitting mechanisms that are activated or engaged to achieve the various gear states. An "X" in the box means that the particular clutch or brake is engaged to achieve the desired gear state. Actual numerical gear ratios of the various gear states are also presented although it should be appreciated that these numerical values are exemplary only and that they may be adjusted over significant ranges to accommodate various applications and operational criteria of the transmission 100. Of course, other gear ratios are achievable depending on the gear diameter, gear teeth count and gear configuration selected.

For example to establish first a reverse gear (REV1), first clutch 124, third clutch 128 and first and second brakes 134 and 136 are engaged or activated. The first clutch 124 connects the eighth shaft or interconnecting member 158 with the common rotational member J. The third clutch 128 connects the fourth shaft or interconnecting member 148 with the common rotational member J. The first brake 134 connects the third shaft or interconnecting member 146 with the stationary element or the transmission housing 150 in order to restrict the member 146 and ring gear 114C from rotating relative to the transmission housing 150. The second brake 136 connects the first shaft or interconnecting member 142 with the stationary element or the transmission housing 150 in order to restrict the member 142 and sun gears 114A and 116A from rotating relative to the transmission housing 150. Likewise, the eleven forward ratios are achieved through different combinations of clutch and brake engagement, as shown in FIG. 7. Moreover, the transmission 100 of the present invention is capable of producing alternate gear ratios for a given gear state, as shown in FIG. 7. The alternate gear ratios are achieved, as indicated in a FIG. 7, through the selective engagement of torque transmitting members 124, 126, 128, 130, 132, 134 and 136.

Figure 8:
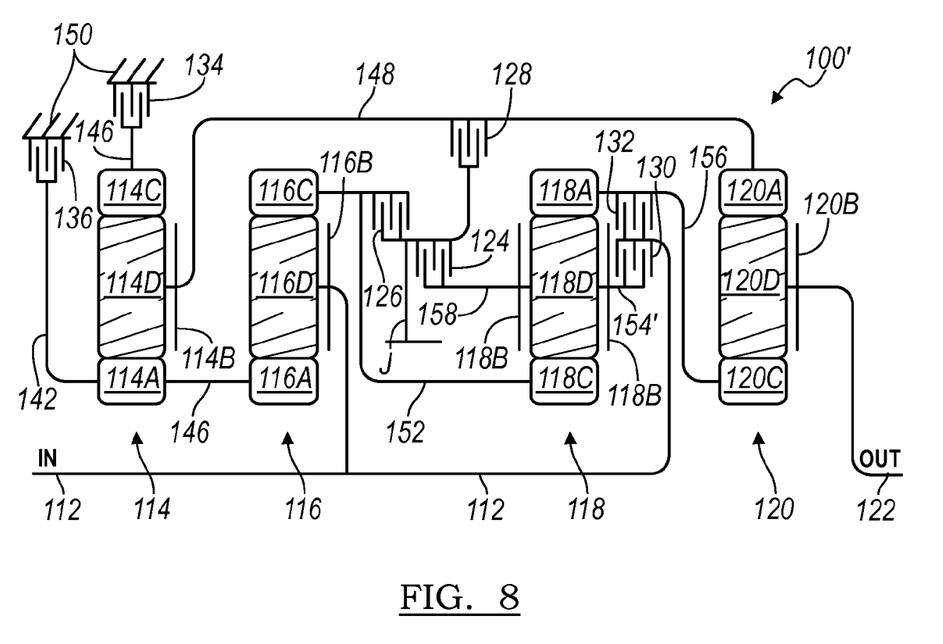
FIG. 8 is a diagrammatic illustration of yet another embodiment of an eleven speed transmission according to the present invention.

Referring now to FIG. 8, another embodiment of the present invention is illustrated in stick diagram format and referenced as eleven speed transmission 100'. Transmission 100' has the same components as transmission 100, shown in FIG. 6, including: planetary gear sets 114, 116, 118 and 120, torque transmitting members 124, 126, 128, 130, 132, 134 and 136, interconnecting members 142, 144, 146, 148, 150, 152, 156 and 158 and common rotational member J. However, clutch 130 has been relocated and now interconnects a reconfigured interconnecting member 154' with input member 112, as shown in FIG. 8. Interconnecting member 154 has been reconfigured as interconnecting member 154' and now interconnects carrier member 118B with clutch 130.

Figure 9:
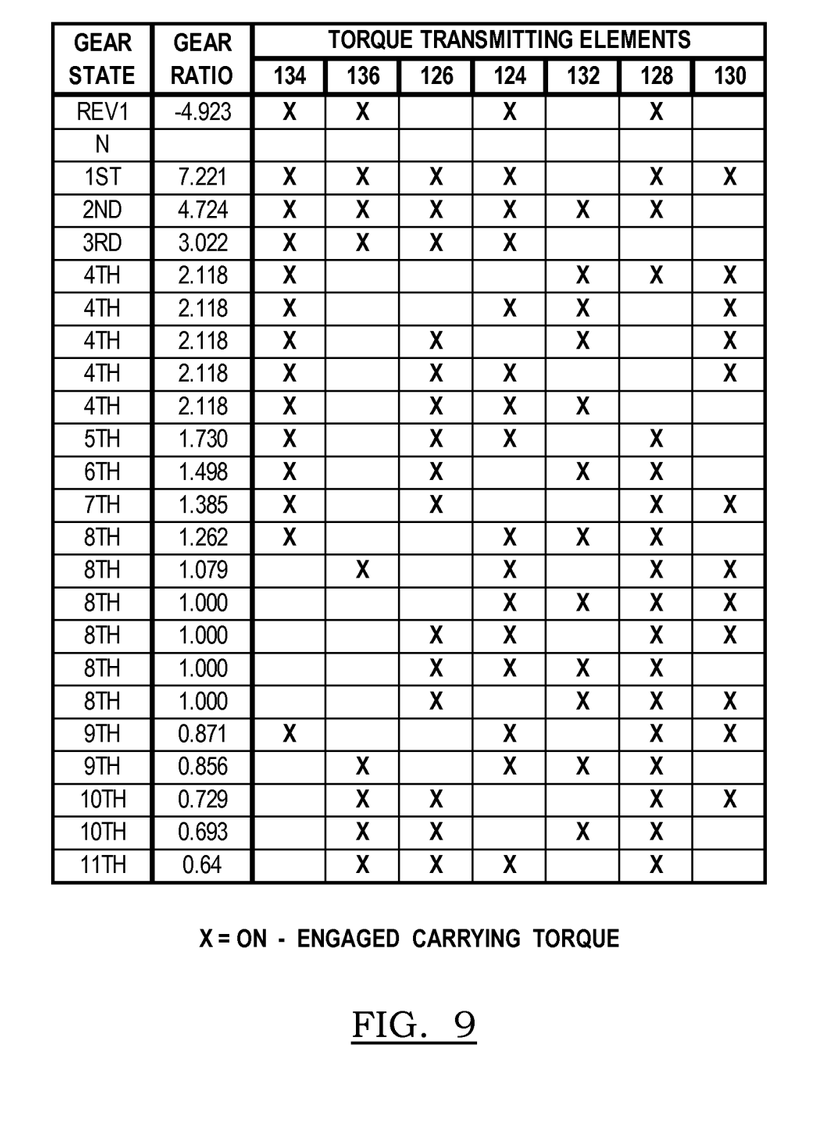
FIG. 9 is a truth table presenting the states of engagement of the various torque transmitting elements in each of the available forward and reverse speeds or gear ratios and additional speeds or gear ratios of the transmission illustrated in FIG. 8.

FIG. 9 is a truth table presenting the various combinations of torque-transmitting mechanisms that are activated or engaged to achieve the various gear states of the transmission 100'. As described previously with respect to transmissions 10 and 100, an "X" in the box means that the particular clutch or brake is engaged to achieve the desired gear state. Actual numerical gear ratios of the various gear states are also presented although it should be appreciated that these numerical values are exemplary only and that they may be adjusted over significant ranges to accommodate various applications and operational criteria of the transmission 100'. Moreover, the transmission 100' of the present invention is capable of producing alternate gear ratios for a given gear state, as shown in FIG. 9. The alternate gear ratios are achieved, as indicated in a FIG. 9, through the selective engagement of torque transmitting members 124, 126, 128, 130, 132, 134 and 136.

The description of the invention is merely exemplary in nature and variations that do not depart from the gist of the invention are intended to be within the scope of the invention. Such variations are not to be regarded as a departure from the spirit and scope of the invention.

The invention claimed is:

1. A transmission comprising:
an input member;
an output member;
first, second, third and fourth planetary gear sets each having first, second and third members;
three interconnecting members continuously interconnecting a member of the first, second, third and fourth planetary gear sets with another member of the first, second, third and fourth planetary gear sets; and
seven torque transmitting mechanisms wherein five of the seven torque transmitting mechanisms are each selectively engageable to interconnect at least one of the first, second and third members of the first, second, third and fourth planetary gear sets with at least one other of the first, second, third members of the first, second, third and fourth planetary gear sets and wherein two of the seven torque transmitting mechanisms are each selectively engageable to interconnect at least one of the first, second and third members of the first, second, third and fourth planetary gear sets with a stationary member, and wherein the seven torque transmitting mechanisms are each selectively engageable in combinations of at least four to establish a plurality of forward speed ratios and at least one reverse speed ratio between the input member and the output member.

2. The transmission of claim 1 wherein the input member is continuously connected for common rotation with the second member of the second planetary gear set.

3. The transmission of claim 1 wherein the output member is continuously connected for common rotation with the second member of the fourth planetary gear set.

4. The transmission of claim 1 wherein the first member of the first planetary gear set, the first member of the second planetary gear set, the third member of the third planetary gear set and the third member of the fourth planetary gear set are sun gears, the second members of the first, second, third and fourth planetary gear sets are carrier members and the third member of the first planetary gear set, the third member of the second planetary gear set, the first member of the third planetary gear set and the first member of the fourth planetary gear set are ring gears.

5. The transmission of claim 1 wherein a first of the three interconnecting members continuously interconnects the first member of the first planetary gear set with the first member of the second planetary gear set, a second of the three interconnecting members continuously interconnects the second member of the first planetary gear set with the first member of the fourth planetary gear set and a third of the three interconnecting members continuously interconnects the third member of the second planetary gear set with the third member of the third planetary gear set.

6. The transmission of claim 5 wherein a first of the seven torque transmitting mechanisms is selectively engageable to interconnect the third member of the second planetary gear set and the third member of the third planetary gear set with the first member of the third planetary gear set.

7. The transmission of claim 6 wherein a second of the seven torque transmitting mechanisms is selectively engageable to interconnect the second member of the first planetary gear set and the first member of the fourth planetary gear set with the second member of the third planetary gear set.

8. The transmission of claim 7 wherein a third of the seven torque transmitting mechanisms is selectively engageable to interconnect the second member of the second planetary gear set and the input member with the second member of the third planetary gear set.

9. The transmission of claim 8 wherein a fourth of the seven torque transmitting mechanisms is selectively engageable to interconnect the second member of the second planetary gear set and the input member with the third member of the fourth planetary gear set.

10. The transmission of claim 9 wherein a fifth of the seven torque transmitting mechanisms is selectively engageable to interconnect the first member of the third planetary gear set with the third member of the fourth planetary gear set.

11. The transmission of claim 10 wherein a sixth of the seven torque transmitting mechanisms is selectively engageable to interconnect the third member of the first planetary gear set with the stationary member.

12. The transmission of claim 11 wherein a seventh of the seven torque transmitting mechanisms is selectively engageable to interconnect the first member of the first planetary gear set with the stationary member.

13. A transmission comprising:
an input member;
an output member;
first, second, third and fourth planetary gear sets each having first, second and third members;
a first interconnecting member continuously interconnecting the first member of the first planetary gear set with the first member of the second planetary gear set;
a second interconnecting member continuously interconnecting the second member of the first planetary gear set with the first member of the fourth planetary gear set;
a third interconnecting member continuously interconnecting the third member of the second planetary gear set with the third member of the third planetary gear set; and
seven torque transmitting mechanisms each selectively engageable to interconnect at least one of the first, second, and third members with at least one other of the first, second, third members and a stationary member, and
wherein the seven torque transmitting mechanisms are each selectively engageable in combinations of at least four to establish a plurality of forward speed ratios and at least one reverse speed ratio between the input member and the output member and a first of the seven torque transmitting mechanisms is selectively engageable to interconnect the third member of the second planetary gear set and the third member of the third planetary gear set with the first member of the third planetary gear set.

14. The transmission of claim 13 wherein the input member is continuously connected for common rotation with the second member of the second planetary gear set.

15. The transmission of claim 13 wherein the output member is continuously connected for common rotation with the second member of the fourth planetary gear set.

16. The transmission of claim 13 wherein the first member of the first planetary gear set, the first member of the second planetary gear set, the third member of the third planetary gear set and the third member of the fourth planetary gear set are sun gears, the second members of the first, second, third and fourth planetary gear sets are carrier members and the third member of the first planetary gear set, the third member of the second planetary gear set, the first member of the third planetary gear set and the first member of the fourth planetary gear set are ring gears.

17. The transmission of claim 13 wherein a second of the seven torque transmitting mechanisms is selectively engageable to interconnect the second member of the first planetary gear set and the first member of the fourth planetary gear set with the second member of the third planetary gear set.

18. The transmission of claim 17 wherein a third of the seven torque transmitting mechanisms is selectively engageable to interconnect the second member of the second planetary gear set and the input member with the second member of the third planetary gear set.

19. The transmission of claim 18 a fourth of the seven torque transmitting mechanisms is selectively engageable to interconnect the second member of the second planetary gear set and the input member with the third member of the fourth planetary gear set.

20. The transmission of claim 19 wherein a fifth of the seven torque transmitting mechanisms is selectively engageable to interconnect the first member of the third planetary gear set with the third member of the fourth planetary gear set.

21. The transmission of claim 20 wherein a sixth of the seven torque transmitting mechanisms is selectively engageable to interconnect the third member of the first planetary gear set with the stationary member.

22. The transmission of claim 21 wherein a seventh of the seven torque transmitting mechanisms is selectively engageable to interconnect the first member of the first planetary gear set with the stationary member.

23. A transmission comprising:
an input member;
an output member;
first, second, third and fourth planetary gear sets each having a sun gear, a carrier member and a ring gear, wherein the input member is continuously connected for common rotation with the carrier member of the second planetary gear set, and wherein the output member is continuously connected for common rotation with the carrier member of the fourth planetary gear set;
a first interconnecting member continuously interconnecting the carrier member of the first planetary gear set with the ring gear of the fourth planetary gear set;
a second interconnecting member continuously interconnecting the sun gear of the first planetary gear set with the sun gear of the second planetary gear set;
a third interconnecting member continuously interconnecting the ring gear of the second planetary gear set with the sun gear of the third planetary gear set;
a fourth interconnecting member continuously interconnecting the ring gear of the third planetary gear set with the sun gear of the fourth planetary gear set;
a first torque transmitting mechanism selectively engageable to interconnect the carrier member of the third planetary gear set with an independently rotating member;
a second torque transmitting mechanism selectively engageable to interconnect the ring gear of the second planetary gear set and the sun gear of the third planetary gear set with the independently rotating member;
a third torque transmitting mechanism selectively engageable to interconnect the carrier member of the first planetary gear set and the ring gear of the fourth planetary gear set with the independently rotating member;
a fourth torque transmitting mechanism selectively engageable to interconnect the carrier member of the second planetary gear set and the input member with the independently rotating member;
a fifth torque transmitting mechanism selectively engageable to interconnect the ring gear of the third planetary gear set and the sun gear of the fourth planetary gear set with the carrier member of the second planetary gear set and the input member;
a sixth torque transmitting mechanism selectively engageable to interconnect the ring gear of the first planetary gear set with a stationary member; and
a seventh torque transmitting mechanism selectively engageable to interconnect the sun gear of the first planetary gear set and the sun gear of the second planetary gear set with the stationary member, and
wherein the torque transmitting mechanisms are selectively engageable in combinations of at least four to establish a plurality of forward speed ratios and at least one reverse speed ratio between the input member and the output member.

24. A transmission comprising:
an input member;
an output member;

first, second, third and fourth planetary gear sets each having a sun gear, a carrier member and a ring gear, wherein the input member is continuously connected for common rotation with the carrier member of the second planetary gear set, and wherein the output member is continuously connected for common rotation with the carrier member of the fourth planetary gear set;

a first interconnecting member continuously interconnecting the carrier member of the first planetary gear set with the ring gear of the fourth planetary gear set;

a second interconnecting member continuously interconnecting the sun gear of the first planetary gear set with the sun gear of the second planetary gear set;

a third interconnecting member continuously interconnecting the ring gear of the second planetary gear set with the sun gear of the third planetary gear set;

a fourth interconnecting member continuously interconnecting the ring gear of the third planetary gear set with the sun gear of the fourth planetary gear set;

a first torque transmitting mechanism selectively engageable to interconnect the carrier member of the third planetary gear set with an independently rotating member;

a second torque transmitting mechanism selectively engageable to interconnect the ring gear of the second planetary gear set and the sun gear of the third planetary gear set with the independently rotating member;

a third torque transmitting mechanism selectively engageable to interconnect the carrier member of the first planetary gear set and the ring gear of the fourth planetary gear set with the independently rotating member;

a fourth torque transmitting mechanism selectively engageable to interconnect the carrier member of the third planetary gear set with the input member and the carrier member of the second planetary gear set;

a fifth torque transmitting mechanism selectively engageable to interconnect the ring gear of the third planetary gear set and the sun gear of the fourth planetary gear set with the carrier member of the second planetary gear set and the input member;

a sixth torque transmitting mechanism selectively engageable to interconnect the ring gear of the first planetary gear set with a stationary member; and a seventh torque transmitting mechanism selectively engageable to interconnect the sun gear of the first planetary gear set and the sun gear of the second planetary gear set with the stationary member, and wherein the torque transmitting mechanisms are selectively engageable in combinations of at least four to establish a plurality of forward speed ratios and at least one reverse speed ratio between the input member and the output member.

\* \* \* \* \*